United States Patent [19]

Grieb et al.

[11] Patent Number: 4,974,129
[45] Date of Patent: Nov. 27, 1990

[54] AUTOMOBILE SOLAR POWERED UTILITY LIGHT

[75] Inventors: Dale C. Grieb, Fallston; Aparna R. Mishra, Baltimore; Roderick F. Bunyea, Westminster, all of Md.

[73] Assignee: Black & Decker, Inc., Newark, Del.

[21] Appl. No.: 403,414

[22] Filed: Sep. 6, 1989

[51] Int. Cl.⁵ ............................................... F21L 7/00
[52] U.S. Cl. ................................... 362/183; 362/83.1; 362/190; 362/191
[58] Field of Search ....................... 362/61, 80.1, 83.1, 362/83.3, 183, 186, 190, 191

[56] References Cited

U.S. PATENT DOCUMENTS

| | | | |
|---|---|---|---|
| D. 287,644 | 1/1987 | Gierke | D26/60 |
| 1,940,605 | 12/1933 | Roberts | 362/83.1 |
| 2,060,401 | 11/1936 | Smith | 362/83.1 |
| 4,327,316 | 4/1982 | Fujikubo et al. | 320/2 |
| 4,443,832 | 4/1984 | Godfrey et al. | 362/80 |
| 4,754,376 | 6/1988 | Winslow | 362/191 |
| 4,833,241 | 4/1989 | Trattner | 362/190 |

OTHER PUBLICATIONS

Black & Decker Automotive Products and Accessories Catalog (1987), p. 50.
Black & Decker Household Products Catalog (1984-1985) p. 11.

Primary Examiner—Ira S. Lazarus
Assistant Examiner—Sue Hagarman
Attorney, Agent, or Firm—Dennis A. Dearing; Charles E. Yocum; John D. Del Ponti

[57] ABSTRACT

An automobile solar powered rechargeable battery-operated utility light comprises a housing, a light bulb, and a rechargeable battery. A solar panel is exposed through a housing wall for receiving solar radiation and generating a charge current for the battery. A bracket supports the light housing with the solar panel facing an automobile windshield and is releasably attached to the housing and to a post for supporting the automobile rear view mirror. The light is located at an optimum position for reception of incoming solar radiation and at a convenient location for removal for use.

5 Claims, 3 Drawing Sheets

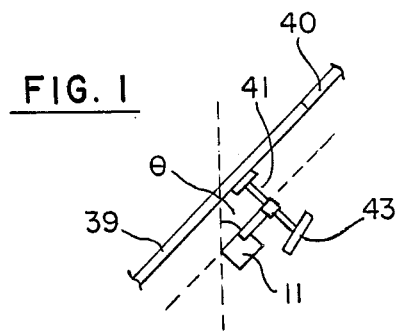
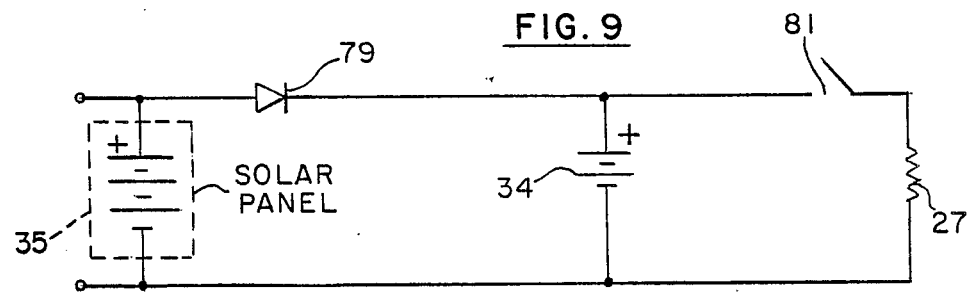
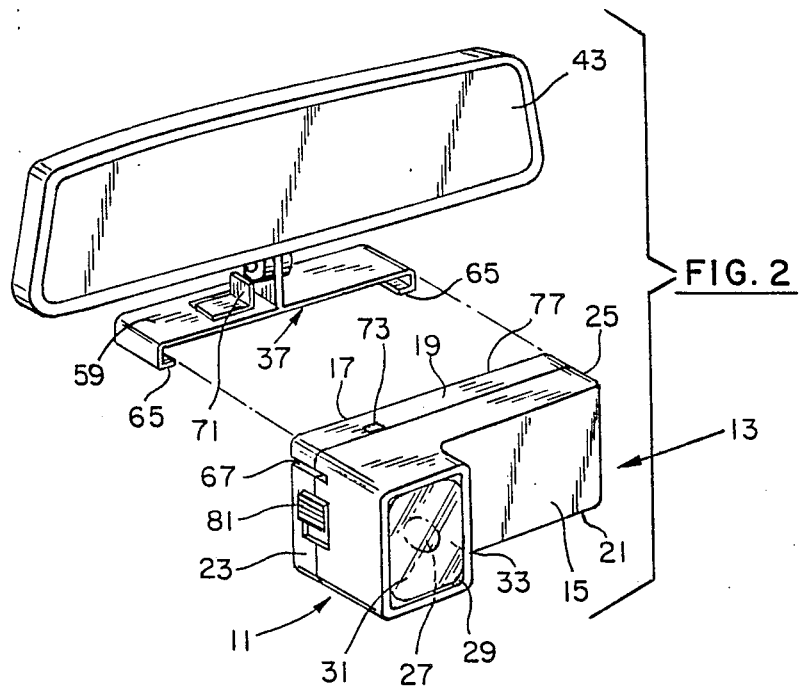

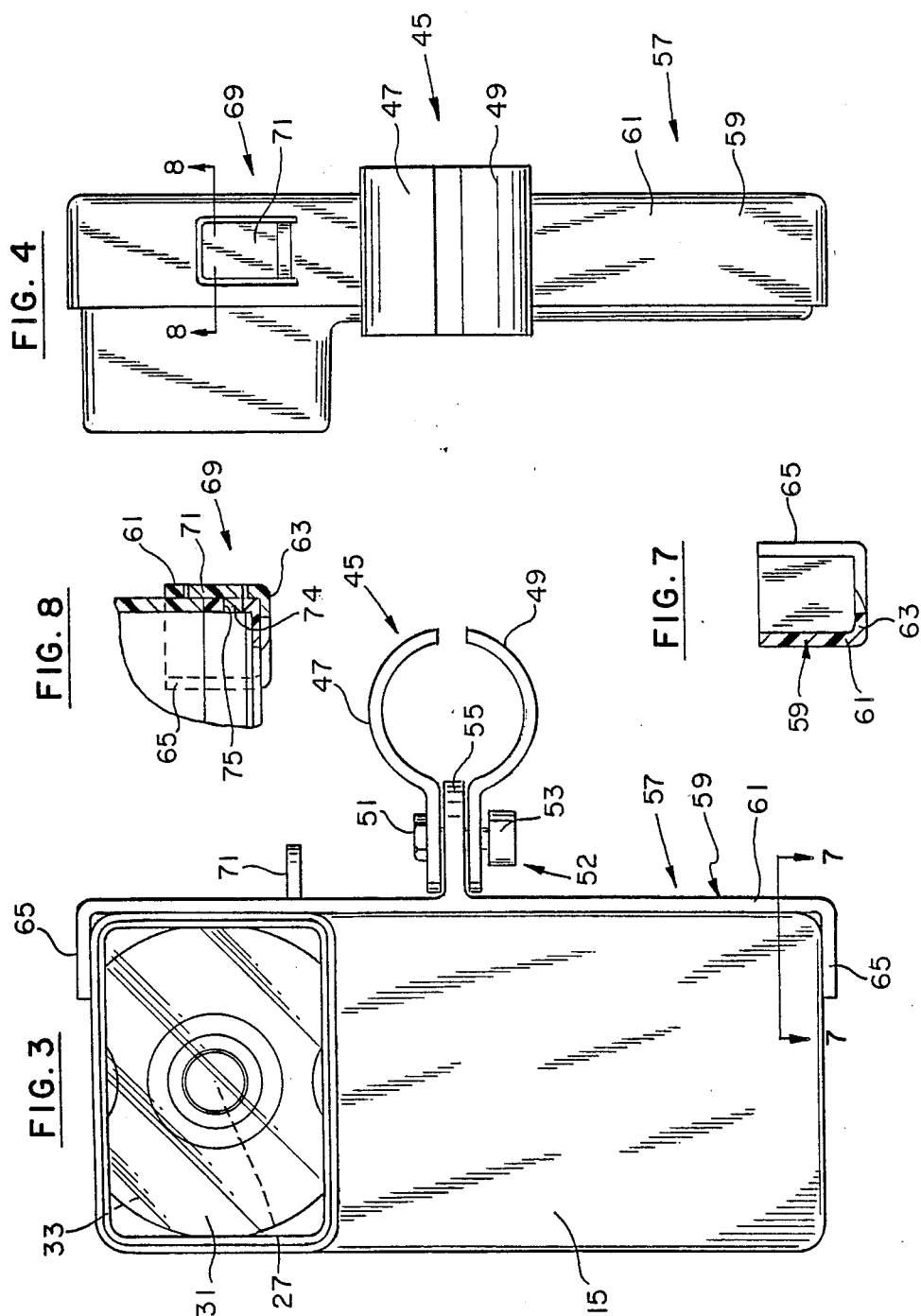

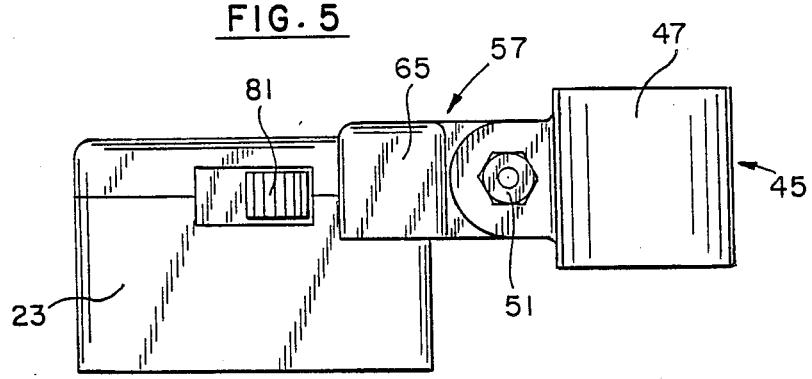
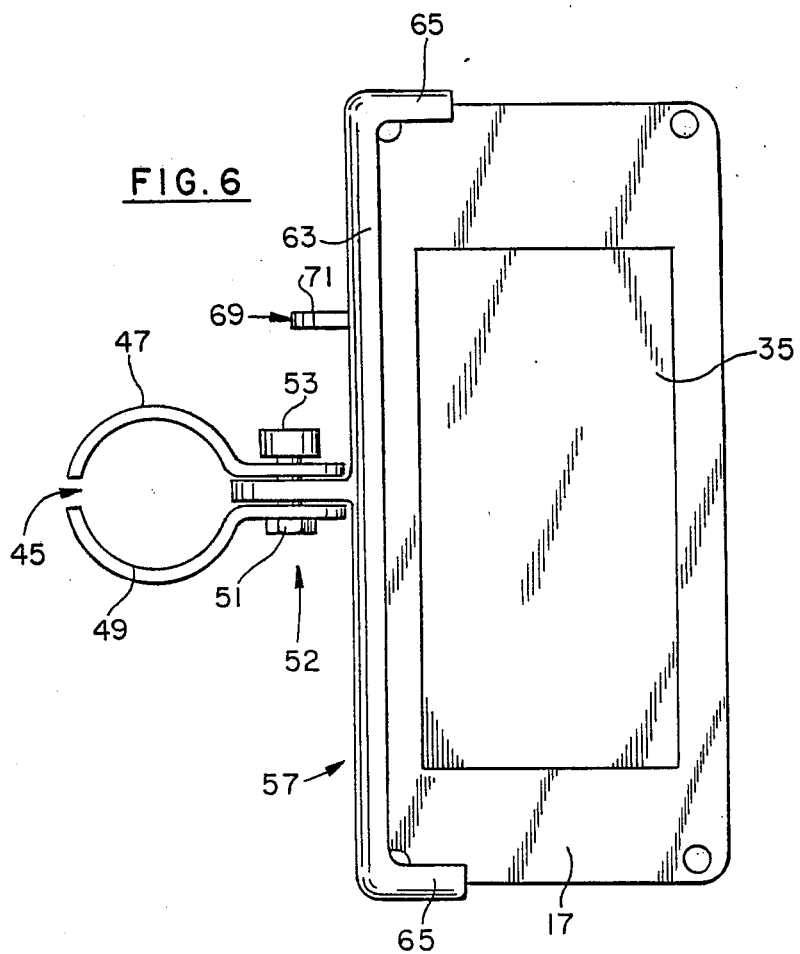

AUTOMOBILE SOLAR POWERED UTILITY LIGHT

BACKGROUND OF THE INVENTION

The present invention relates to battery-operated lights and more particularly to rechargeable battery-operated lights for use in automobiles and having a solar panel for recharging the battery.

There are a number of general types of utility lighting which have been used for automotive application. One type is a light, such as a flashlight, energized by primary batteries and is disadvantageous because the primary batteries must be periodically replaced. The replacement of the battery may be particularly annoying to an end user when the light is needed for night time repairs and the batteries are already or become discharged during use.

A second type of prior art light is exemplified in U.S. Pat. No. 4,443,831 which is poWered by a rechargeable battery. Such a light has the disadvantage that the battery must be periodically recharged by connection to a charger and power source or to a power source if the charger is built into the light as in U.S. Pat. No. 4,443,831. The patent does not disclose charger power source for the light. However, such lights are typically recharged by connection of a built in or external charger to a power source external to the automobile or to the automobile battery circuit. As will be apparent, removal of the light from the automobile for recharging is inconvenient. Also, recharging of the light through connection of the charger to the automobile battery circuit is a hindrance to the commercial acceptance of such lights because consumers lack the technical expertise to connect the charger to the battery circuit.

The light disclosed in U.S. Pat. No. 4,443,831 is located behind an automobile rear view mirror with a recess in the case straddling the support post of the mirror and is secured to the mirror by a pair of spring biased clips. The light may be removed from the mirror for usage as a utility light, for example, for repairs. However, this light suffers from the disadvantages that the light is not readily removable from the mirror, would restrict adjustment of the rear view mirror, and would probably result in misadjustment of the mirror each time the light is removed for usage.

Another known type of automobile utility light is energized directly by a cord connected between the light and the automotive battery circuit. The connection to the battery circuit is normally made by insertion of a plug in the automobile cigarette light. This type of light has the disadvantage of requiring a cord for use.

The present invention overcomes many of the disadvantages associated with the prior art automotive lights by providing a solar powered rechargeable battery-operated light supported in an optimum and convenient location in the automobile. Additionally, a light in accordance with this invention requires no connection to the automobile battery circuit, is cordless in use, and requires no maintenance to provide a light which is normally fully charged when use is desired.

Additional objects and advantages of the invention will be apparent from the detailed description of the preferred embodiment or may be learned by practice of the invention.

SUMMARY OF THE INVENTION

In accordance with the invention, as embodied and described herein, an automobile solar powered utility light comprises a housing, a light generating means, and a rechargeable battery. A solar panel is exposed through a housing wall for receiving solar energy and generating a charge current for the battery. A bracket for supporting the light with the solar panel facing an automobile windshield is releasably attached to the housing and to a post for supporting the automobile rear view mirror.

Preferably, the bracket may have at one end an adjustable clamp for alternately receiving posts having different circumferences.

The bracket preferably has a light holder at the other end comprising a strap extending along a second housing wall and terminating at each end in an "L" shaped flange engaged respectively in a groove formed in each of the second and fourth walls of the housing. The clamp may further comprise a pair of spaced fingers for encircling the mirror post and means for adjusting the spacing between the fingers to alternatively accommodate a range of post sizes.

The light may further comprise a detent including a cantilevered resilient tab formed in the strap and a recess formed in the second housing wall. A protrusion on the detent tab is normally biased to be received within the recess and prevents separation of the housing from the bracket by engagement of the protrusion with the sidewalls of the recess.

BRIEF DESCRIPTION OF THE DRAWINGS

The accompanying drawings which are incorporated in, and constitute a part of, this specification illustrate one embodiment of the invention and together with the description serve to explain the principles of the invention.

FIG. 1 is a perspective schematic view of a light installed on a post for supporting a rear view mirror in an automobile passenger compartment in accordance with an embodiment of the invention.

FIG. 2 is a perspective exploded view of the light shown in FIG. 1

FIG. 3 is a front elevational view of the light shown in FIG. 1.

FIG. 4 is a plan view of the light shown in FIG. 1.

FIG. 5 is a side elevational view of the light shown in FIG. 1.

FIG. 6 is a rear elevational view of the light shown in FIG. 1.

FIG. 7 is a fragmentary cross-sectional view of a portion of the light taken along line 7—7 in FIG. 3.

FIG. 8 is a fragmentary cross-sectional view of another portion of the light taken along line 8—8 in FIG. 4.

FIG. 9 is a schematic diagram of the electrical circuit for the light shown in FIG. 1.

DETAILED DESCRIPTION OF THE PREFERRED EMBODIMENT

Reference will now be made to the preferred embodiment of the invention, an example of which is illustrated in the accompanying drawings.

The automobile solar powered utility light of the invention comprises a housing, a light generating means, and a rechargeable battery. As depicted best in FIGS. 2-6, the automobile solar powered utility light 11 comprises a housing 13 having a front wall 15, rear wall 17, top wall 19, bottom wall 21 and sidewalls 23,25. Adjacent housing walls are mutually perpendicular and opposed housing walls are parallel. As depicted, a block shaped housing configuration is preferred. However, many other housing configurations can be used. The housing is preferably made of a molded plastic such as copolymer polypropylene (U.V. stabalized).

As embodied herein, the light generating means comprises a bulb 27 exposed through an opening 29 in front wall 15 which is covered by a transparent plastic lens 31. A reflector 33 is mounted behind bulb 27 and reflects light from bulb 27 outwardly through lens 31.

As shown schematically in FIG. 9, the rechargeable battery is preferably a rechargeable, sealed, lead acid battery 34 (for example, a 76 amp hour, type UP2V-1.OP, two-volt battery manufactured by Panasonic). Other battery types may also be suitable for this application.

In accordance with the invention, the light further comprises a solar panel exposed through one wall of the housing for receiving solar energy through an automobile windshield and generating a charge current for the rechargeable battery. As embodied herein, a solar panel 35, depicted in FIG. 6, is exposed through the rear wall 17 of housing 13 for receiving solar radiation through an automobile windshield 39 and, in accordance with well-known principles, generating a current for charging battery 34. The panel is preferably a crystalline solar panel but may also be an amorphous solar panel. Such panels are commercially available from Arco Solar Company.

In accordance with the invention, the light further comprises a bracket for supporting the light with the solar panel facing an automobile windshield and releasably attached to the housing and to a post for supporting an automobile rear view mirror adjacent to the automobile windshield. As embodied herein and depicted in FIG. 1, bracket 37 supports housing 13 with solar panel 35 facing the automobile windshield 39 and is releasably attached to housing 13 and to a post 41 for supporting a rear view mirror 43 adjacent to windshield 39. As depicted in FIGS. 1, 2, light housing 13 is suspended below mirror 43 for convenience of access by the user and for optimum exposure to incoming solar radiation through windshield 39. Many automobiles currently in use have a shade band 40 applied to an upper portion of windshield 39 for protecting occupants from solar glare. Such bands filter a high proportion of incoming visible light radiation. Because solar panels are primarily responsive to visible light wave length radiation, the disposition of the light housing 13 below mirror 39 is preferred. In the preferred embodiment, the top edge of solar panel 35 is supported two centimeters below the lower edge of mirror 43.

In the preferred embodiment, bracket 37 has an adjustable clamp 45 (FIGS. 5,6) for alternatively receiving mirror posts having different circumferences. It is desired to make the clamp 45 suitable for attachment to the range of mirror post circumferences used in most automobiles on the market. For this purpose, the clamp 45 may comprise a pair of spaced fingers 47,49 for encircling post 41 and a means 52 for adjusting the spacing between the fingers 47,49 to alternatively accommodate the desired range of posts sizes. The means 52 for adjusting the spacing between fingers 47,49 comprises a nut 51 and a bolt 53 inserted through aligned openings in fingers 47,49 and a tab 55 at one end of bracket 37.

The bracket 37 may further include a light holder 57 formed at the end of the bracket opposite to clamp 45. Holder 57 comprises a strap 59 extending along housing wall 19 and terminating at each end in an "L" shaped flange 65 slideably engaged in a groove 67 formed each in wall 23,25. Strap 59 is formed with a major portion 61 extending parallel to top housing wall 19 and a minor portion 63 extending parallel to rear housing wall 17. Minor portion 63 adds structural integrity to strap 59 and provides a firm seating for housing 13 due to the engagement of strap 59 with both the rear housing wall 17 and top housing wall 19.

The means 52 for adjusting the spacing between fingers 47, 49 also serves as a means for pivotally mounting the clamp 45 relative to holder 57 with bolt 53 serving as a pivot for fingers 47, 49 relative to tab 55. By adjustment of the holder 57 and thus housing 13, panel 35 may be oriented at an optimum angle to receive incoming solar radiation through windshield 39. It is generally known that an optimum angle for orientation of a planar solar panel for maximum reception of incoming radiation in ideal conditions is approximately 45° relative to a vertical axis. The optimum angle varies with the latitude of the location (i.e., the distance from the equator) at which the solar panel is located. The user may, of course, choose the appropriate angle 0 based on his location.

To ensure retention of light housing 13 in holder 57, light housing 13 may further comprises a detent 69 (best depicted in FIGS. 2–4, 7, 8) including a cantilevered resilient tab 71 formed in strap 59 and a recess 73 formed in housing wall 19. A protrusion 74 is formed on the front rear corner of tab 71 and is sized to fit within recess 73. Protrusion 74 is normally biased by tab 71 to be received within recess 73 preventing separation of housing 13 from holder 57 by engagement with the sidewalls 75 of recess 73. To remove light housing 13 from holder 57, tab 71 is pivoted clockwise (FIG. 2) away from light housing 13 until protrusion 74 is spaced above recess sidewalls 75 permitting light housing 13 to be slid forwardly to disengage "L" shaped flanges 65 from grooves 67. To reinsert light 13 in holder 57, grooves 67 are aligned respectively with "L" shaped flanges 65 and the light housing 13 is slid rearwardly until an edge 77 formed between housing walls 17,19 engages the downwardly sloping surface of protrusion 74. By engagement of edge 77 with protrusion 74 71, tab 71 and protrusion 74 are pivoted slightly in a clockwise direction (as viewed in FIG. 2) permitting wall 19 to slide under protrusion 74 until protrusion 74 is aligned with recess 73. Upon alignment, protrusion 74 is pivoted into recess 73 due to the normal bias of tab 71.

An electrical circuit diagram for light 11 is shown in FIG. 9. The circuit is conventional and includes panel 35 connected to battery 34 through a blocking diode 79. Diode 79 prevents discharge of battery 34 through panel 35. Bulb 27 is connected to battery 34 through an on/off switch 81.

It will be apparent to those skilled in the art that various modifications and variations can be made in the automobile solar powered utility light of the present invention without departing from the scope or the spirit of the invention. Thus, it is intended that the present invention cover these modifications and variations provided they come within the scope of the appended claims and their equivalents.

We claim:

1. An automobile solar powered utility light for mounting on a support post for an automobile rear view mirror adjacent and transverse to an automobile windshield comprising:
   a housing having a first wall;
   a light generating means;
   a rechargeable battery;
   a solar panel exposed through the first wall for receiving a solar energy and generating a charge current for the battery; and
   a bracket for supporting the housing with the solar panel facing the windshield and for releasably attaching to the housing and to the mirror post, said bracket comprising an adjustable clamp for alternatively receiving posts of different sized perimeters and means for pivotally mounting the clamp for movement about an axis transverse to the mirror post and parallel to the solar panel.

2. The light of claim 1 wherein
   the bracket has a light holder comprising a strap terminating at each end in an "L" shaped flange;
   the housing has second, third and fourth walls perpendicularly extending from the first wall and has a groove formed in each of the second and fourth walls;
   said strap extends along the third wall; and
   the flanges are engaged in the grooves formed in the second and fourth walls.

3. The light of claim 2 further comprising a detent including a cantilevered resilient tab formed in said strap and a recess formed in the third housing wall, the detent tab being normally biased to be received within said recess and preventing separation of the housing from the bracket by engagement with the sidewalls of the recess.

4. A rechargeable battery-operated light for use in an automobile comprising:
   a housing having front, rear, top, bottom, left and right sidewalls;
   a solar panel exposed through the rear wall of the housing; and
   a bracket for supporting the housing with the panel facing the windshield, having a light holder at one end releasably engaging the left and right sidewalls, having an adjustable clamp for alternatively releasably engaging automobile rear view mirror posts of different circumferences and having a means for pivotally mounting the clamps for movement about an axis transverse to the mirror post and parallel to the solar panel.

5. The light of claim 1 or 4 wherein the clamp comprises
   a pair of spaced fingers for encircling the post and
   means for adjusting the spacing between the fingers to alternatively accommodate posts having different sized perimeters.

* * * * *